United States Patent [19]
Cooley

[11] 3,845,407

[45] Oct. 29, 1974

[54] LASER GLASS HOST COMPOSITIONS COMPRISING $TEO_2$, CAO AND ZNO

[75] Inventor: Richard F. Cooley, Toledo, Ohio

[73] Assignee: Owens-Illinois, Inc., Toledo, Ohio

[22] Filed: June 27, 1973

[21] Appl. No.: 373,924

[52] U.S. Cl. ................. 331/94.5 E, 252/301.4 R, 252/301.6 R, 106/47 Q
[51] Int. Cl. ........ H01s 3/00, C03c 3/12, C03c 3/30
[58] Field of Search ...................... 106/47 Q, 47 R; 331/94.5 E; 252/301.4 R, 301.4 F, 301.6 R

[56] References Cited
UNITED STATES PATENTS
3,423,326  1/1969  Redman ................... 252/301.6 R

FOREIGN PATENTS OR APPLICATIONS
736,073  8/1955  Great Britain ................. 106/47 Q
741,986  12/1955  Great Britain ................. 106/47 Q
1,496,561  9/1972  Germany ........................ 106/47 Q

OTHER PUBLICATIONS
Stanworth, "Tellurite Glasses," J. Soc. Glass Tech., vol. 36, (1952) pp. 217-241, TP 845 S678.

*Primary Examiner*—Winston A. Douglas
*Assistant Examiner*—Mark Bell
*Attorney, Agent, or Firm*—Richard D. Heberling; E. J. Holler

[57] ABSTRACT

Laser glass host compositions for effective lasing amounts of $Nd_2O_3$ are disclosed, the host compositions comprising $TeO_2$, CaO and ZnO in certain molar amounts that are defined by the areas within the heavy lines connecting certain points of the ternary diagram of the FIGURE of the drawings. Also disclosed are methods of making highly efficient laser articles such as rods and discs, from the host laser glass compositions. Also disclosed is the new use of the above-described $TeO_2$/CaO/ZnO compositions for forming laser articles, the new use including forming laser articles from the compositions, pumping the laser articles to provide an energy inversion, and lasing the pumped article.

8 Claims, 1 Drawing Figure

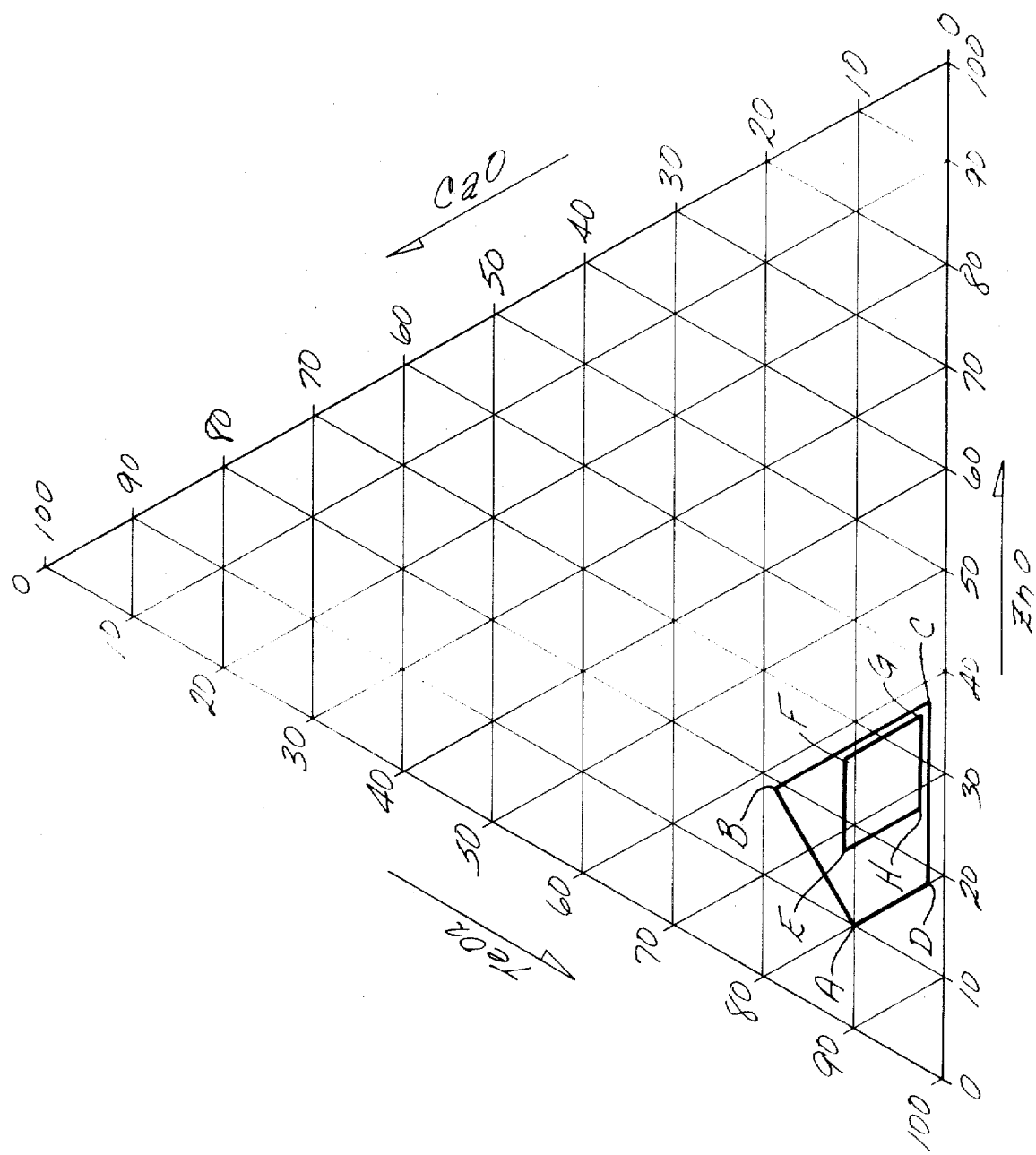

LASER GLASS HOST COMPOSITIONS COMPRISING TEO₂, CAO AND ZNO

INVENTION

The present invention relates to glass host compositions for effective lasing amounts of $Nd_2O_3$, the host compositions comprising $TeO_2$, CaO and ZnO in certain molar proportions. The present invention also relates to methods of making laser articles, the methods including forming laser articles, such as rods or discs, from the glass composition containing certain molar amounts of $TeO_2$, CaO and ZnO, the composition being a host for an effective lasing amount of $Nd_2O_3$.

The present invention also relates to outstanding, highly efficient glass laser articles and to the new use of $TeO_2$/CaO/ZnO glass compositions as hosts for $Nd_2O_3$ in laser glass articles, the new use including forming a glass laser article from the glass composition, pumping the laser article to provide an energy inversion, and lasing the pumped article.

It is desirable to provide improved laser glass compositions that can be used to make outstanding, highly efficient glass laser articles, including rods and discs. It is also desirable to provide methods of making the laser articles and to provide the new use for $TeO_2$/CaO/ZnO glass compositions for making laser articles, the new use comprising forming a glass article from the glass compositions, pumping the laser article and lasing the pumped article.

It is an object of the present invention to provide a laser glass composition comprising $TeO_2$, CaO and ZnO in which the molar proportions thereof are defined in a general range by the area within the heavy lines connecting the points ABCD of the ternary diagram of the FIGURE, the glass composition being a host for an effective lasing amount of $Nd_2O_3$.

It is an object of the present invention to provide a method for making a glass article, in which the method comprises the steps of:

1. melting laser glass batch-forming materials to provide a molten glass comprising $TeO_2$, CaO and ZnO in which the molar proportions thereof are defined in a general range by the area within the heavy lines connecting the points ABCD of the ternary diagram of the FIGURE, the molten glass being a host for an effective lasing amount of $Nd_2O_3$;

2. forming a glass laser blank from the molten glass; and 3. fabricating a laser article from the blank to provide an efficient laser article.

It is an object of the present invention to provide the new use for a $TeO_2$/CaO/ZnO glass composition as a glass laser article in which the molar proportions of $TeO_2$, CaO and ZnO are defined in a general range by the area within the heavy lines connecting the points ABCD in the ternary diagram of the FIGURE, and in which the glass composition is a host for $Nd_2O_3$, the new use comprising the steps of:

1. forming a glass laser article from the glass composition comprising $TeO_2$, CaO and ZnO along with the $Nd_2O_3$;

2. pumping the laser article to provide an energy inversion; and 3. lasing the pumped article.

It is an object of the present invention to provide a highly efficient glass laser article made from a glass composition comprising $TeO_2$, CaO and ZnO, the composition being a host for an effective lasing amount of $Nd_2O_3$.

These and other objects will become apparent from the specification that follows, the appended claims, and the drawings, in which the FIGURE is a ternary diagram of the glass host composition of the present invention, in which the molar proportions of $TeO_2$, CaO and ZnO are defined in a general range by the area within the heavy lines connecting the points ABCD and in a preferred range, by the area within the heavy lines connecting the points EFGH of the ternary diagram.

The present invention provides outstanding laser glass host compositions for effective lasing amounts of $Nd_2O_3$, the host compositions comprising $TeO_2$, CaO and ZnO in certain molar proportions that are defined in a general range by the area within the heavy lines connecting the points ABCD of the ternary diagram of the FIGURE of the drawings. Preferred molar amounts of $TeO_2$, CaO and ZnO are defined by the area within the heavy lines connecting the points EFGH in the ternary diagram.

The present invention also provides methods for making glass laser articles, the methods including the steps of:

1. melting laser glass batch-forming materials to provide a molten glass comprising $TeO_2$, CaO and ZnO in which the molar amounts thereof are defined in a general range by the area within the heavy lines connecting the points ABCD of the ternary diagram, the molten glass capable of functioning as a host for an effective lasing amount of $Nd_2O_3$;

2. forming a glass laser blank from the molten glass; and 3. fabricating laser articles from the glass laser blank.

The present invention also provides the new use for a $TeO_2$/CaO/ZnO glass composition as a glass laser article in which the molar proportions of $TeO_2$, CaO and ZnO are defined in a general range within the area formed by the heavy lines connecting the points ABCD of the ternary diagram, and in which the glass composition is a host for $Nd_2O_3$, the new use comprising the steps of:

1. forming a glass laser article from the $TeO_2$/CaO/ZnO glass composition containing $Nd_2O_3$;

2. pumping the laser article to provide an energy inversion; and 3. lasing the pumped laser article.

A zinc tellurite glass that consists essentially of a major molar proportion of $TeO_2$ and between about 20–40 molar percent ZnO is described and claimed in the Redman U.S. Pat. No. 3,423,326. These zinc tellurite glasses are reported as having fluorescent activity when doped with $Nd_2O_3$.

The glass laser articles made from the host composition of the present invention surprisingly exhibit much higher fluorescent activity than the zinc tellurite glasses of U.S. Pat. No. 3,423,326, the increased fluorescent activity indicating a greater lasing efficiency for the laser article made from the host compositions of the present invention. As previously described, only certain molar proportions of $TeO_2$, CaO and ZnO can be used to produce the highly efficient laser articles. The increase in fluorescent activity of the glasses of the present invention, when compared to the working examples of U.S. Pat. No. 3,423,326, is at least about 50 percent greater than the working examples disclosed in the zinc tellurite system of the Redman patent. The increase in fluorescent activity can be as much as 60 or 70 percent greater than those of working examples of the Redman patent.

Suitable laser glass host compositions of the present invention generally comprise about 62–80 mole percent $TeO_2$, about 2–19 mole percent CaO, and about 10–36 mole percent ZnO. Preferably the laser glass host compositions comprise about 63–72 mole percent $TeO_2$, about 3–11 mole percent CaO, and about 17–34 mole percent ZnO, the host composition preferably containing about 0.01–1.5 mole percent and optimally about 0.4–1.0 mole percent $Nd_2O_3$.

Good results have been obtained with glass laser host compositions comprising about 63–72 mole percent $TeO_2$, about 3–11 mole percent CaO, and about 17–34 mole percent ZnO, the host composition preferably containing about 0.01–1.5 mole percent and optimally about 0.4–1.0 mole percent $Nd_2O_3$.

Good results have been obtained with glass laser host compositions such as those wherein the glass comprises about 70 mole percent $TeO_2$, about 10 mole percent CaO and about 20 mole percent ZnO; or about 64 mole percent $TeO_2$, about 10 mole percent CaO and about 27 mole percent ZnO; or about 63 mole percent $TeO_2$, about 4 mole percent CaO and about 33 mole percent ZnO.

Increased lasing efficiency is obtained for glass laser rods and discs made according to the present invention in which the increase in fluorescent activity is generally at least about 50 percent higher than that of the zinc tellurite glass containing 65 mole percent $TeO_2$ and 35 mole percent ZnO. There is also an increase in fluorescent activity of the glass articles of the present invention that is at least about 50 percent higher than that of a lithiacalcia-alumino silicate laser rod as set forth in U.S. Pat. No. 3,471,409 to Lee and Rapp, in which the glass has the following approximate composition in mole percent.

| Ingredient | Mole Percent |
|---|---|
| $SiO_2$ | 60 |
| $Al_2O_3$ | 2.5 |
| $Li_2O$ | 27.5 |
| CaO | 10 |
| $Nd_2O_3$ | 0.5 |

In general, the highest fluorescent intensity value for a zinc tellurite glass (as above described, containing 35 mole percent ZnO) is about 2.09, and the highest fluorescent intensity value of the above-described lithiacalcia-alumino silicate glass laser, which is the reference laser glass, is held to be 1.0.

The following examples are intended to illustrate the present invention and not to limit the same in any way.

EXAMPLE 1

PART A

A 15 gram melt was prepared by mixing reagent grade raw materials, in the following molar percent and also for convenience, weight percent, with 30 ml. of water.

| Ingredients | Mole Percent | | Weight Percent | |
|---|---|---|---|---|
| | Host Glass | Laser Article | Host Glass | Laser Article |
| $TeO_2$ | 65.0 | 64.6 | 80.1 | 78.6 |
| ZnO | 25.0 | 24.8 | 15.6 | 15.4 |
| CaO | 10.0 | 9.9 | 4.3 | 4.2 |
| $Nd_2O_3$ | — | 0.7 | — | 1.8 |

The slurry was mixed for 10 minutes and poured into a gold crucible. The crucible was placed in an air circulating oven with the temperature maintained at 110°C. overnight to remove the water. The crucible was then placed in an electric resistance furnace with the temperature at 750°C. for 3 hours, or until homogenous, after which the molten glass immediately poured into a preheated (260°C.) graphite mold forming a disc having an 11/16 inch diameter and ¼ inch thickness. The graphite mold was placed in an annealing oven maintained at 340°C. After 1 hour, at 340°C., the temperature of the annealing oven was lowered at a rate of 38°C. per hour to 250°C. after which the annealing oven was turned off and the mold cooled to room temperature.

The solid, annealed glass disc was removed from the mold, wet ground and polished with close tolerance to a thickness of 0.195 inches and a diameter of 0.687 inches. The refractive index of the finished polished glass disc was measured to be 2.06.

PART B

The polished glass disc from Part A was tested for fluorescence intensity and decay time in a high power pulsed test system. The disc was placed in a holder and exposed to a beam of light from an EG & G model FX 12-25 xenon flashlamp. The flashlamp had a flash duration of about 20 microseconds. The disc was not observed to solarize after repeated excitation by the flashlamp. The fluorescence intensity and decay time of the excited sample was measured by photographing the oscilloscope display of the 1060 nanometer fluorescent intensity versus time on a Tektronix Model 556, Dual Trace oscilloscope connected to an RCA S-1 photomultiplier, having a narrow band pass filter.

The fluorescence intensity measurement was normalized against ED-2, a glass laser composition of Owens-Illinois, Inc., comprising, in mole percent 60.0% $SiO_2$, 2.5% $Al_2O_3$, 27.5% $Li_2O$, 10% CaO, 0.16% $CeO_2$ and 0.5% $Nd_2O_3$, disclosed in U.S. Pat. No. 3,471,409, as Example 1. The fluorescence intensity was found to be 3.36 when normalized against the glass laser composition; 3.36 times the intensity of the glass laser composition.

The fluorescence intensity was corrected for the refractive indices of the glass disc and the reference glass laser composition by $$FI \text{ (corrected)} = FI \text{ (normalized)} [(1.56)^2/(\eta \text{ glass disc})^2]$$

The corrected fluorescence intensity was 1.87. The fluorescence decay time was 154 microseconds.

EXAMPLE 2

PART A

A 15 gram melt was prepared and polished glass discs prepared therefrom as described in Part A of Example 1 except the molar or weight percentages of the raw materials were as follows:

|             | Mole Percent | | Weight Percent | |
|-------------|------------|------------------|------------|------------------|
| Ingredients | Host Glass | Laser Article | Host Glass | Laser Article |
| $TeO_2$     | 70.0       | 69.6             | 83.0       | 81.4             |
| ZnO         | 25.0       | 24.8             | 15.1       | 14.8             |
| CaO         | 5.0        | 4.9              | 1.9        | 2.0              |
| $Nd_2O_3$   | —          | 0.7              | —          | 1.8              |

The refractive index of the finished polished glass disc was measured to be 2.06.

PART B

The polished glass disc from Part A was tested for fluorescence intensity and decay time as described in Part B of Example 1. The normalized fluorescence intensity was 3.4 and the corrected fluorescence intensity was 1.89. The fluorescence decay time was 154 microseconds.

EXAMPLE 3

PART A

A 15 gram melt was prepared and polished glass discs prepared therefrom as described in Part A of Example 1 except the molar or weight percentages of the raw materials were as follows:

|             | Mole Percent | | Weight Percent | |
|-------------|------------|------------------|------------|------------------|
| Ingredients | Host Glass | Laser Article | Host Glass | Laser Article |
| $TeO_2$     | 75.0       | 74.6             | 86.3       | 84.9             |
| ZnO         | 20.0       | 19.8             | 11.7       | 11.5             |
| CaO         | 5.0        | 4.9              | 2.0        | 1.9              |
| $Nd_2O_3$   | —          | 0.7              | —          | 1.7              |

The refractive index of the finished polished glass disc was measured to be 2.08.

PART B

The polished glass disc from Part A was tested for fluorescence intensity and decay time as described in Part B of Example 1. The normalized fluorescence intensity was 3.1 and the corrected fluorescence intensity was 1.69. The fluorescence decay time was 154 microseconds.

EXAMPLE 4

PART A

A 15 gram melt was prepared and polished glass discs prepared therefrom as described in Part A of Example 1 except the molar or weight percentages of the raw materials were as follows:

|             | Mole Percent | | Weight Percent | |
|-------------|------------|------------------|------------|------------------|
| Ingredients | Host Glass | Laser Article | Host Glass | Laser Article |
| $TeO_2$     | 75.0       | 74.6             | 87.2       | 85.6             |
| ZnO         | 15.0       | 14.8             | 8.8        | 8.7              |
| CaO         | 10.0       | 9.9              | 4.0        | 4.0              |
| $Nd_2O_3$   | —          | 0.7              | —          | 1.7              |

The refractive index of the finished polished glass disc was measured to be 2.08.

PART B

The polished glass disc from Part A was tested for fluorescence intensity and decay time as described in Part B of Example 1. The normalized fluorescence intensity was 2.99 and the corrected fluorescence intensity was 1.63. The fluorescence decay time was 157 microseconds.

Other specific compositions set forth as being suitable for use in the present invention can be substituted for the specific glass laser compositions used in the working examples to provide substantially equivalent results in suitable specific compositions including those in which the molar amounts of $TeO_2$, CaO and ZnO are defined by the area within the heavy lines connecting the points ABCD of the ternary diagram. Thus, a host glass composition comprising about 68 mole percent $TeO_2$, about 8 mole percent CaO and about 24 mole percent ZnO can be used in place of the specific host composition set forth in Example 1.

What is claimed is:

1. A laser glass host composition comprising $TeO_2$, CaO and ZnO in which the proportions of $TeO_2$, CaO and ZnO in molar amounts are defined by the area within the heavy lines connecting the points ABCD of the ternary diagram of the FIGURE of the drawings, the laser glass host composition being a host for an effective lasing amount of $Nd_2O_3$.

2. A laser glass host composition as defined in claim 1 in which the proportions of $TeO_2$, CaO and ZnO are defined by the areas within the heavy lines connecting the points EFGH in the ternary diagram of the FIGURE of the drawings.

3. A laser glass composition comprising:
   1. a host glass containing about 62–80 mole percent $TeO_2$, about 2–19 mole percent CaO, and about 10–36 mole percent ZnO; and
   2. an effective lasing amount of $Nd_2O_3$.

4. A laser glass host composition comprising about 63–72 mole percent $TeO_2$, about 3–11 mole percent CaO, and about 17–34 mole percent ZnO, the host composition containing about 0.01–1.5 mole percent $Nd_2O_3$.

5. A laser glass composition as defined in claim 3 in which the host glass comprises about 70 mole percent $TeO_2$, about 10 mole percent CaO, and about 20 mole percent ZnO.

6. A laser glass composition as defined in claim 3 in which the glass host comprises about 63 mole percent $TeO_2$, about 10 mole percent CaO, and about 27 mole percent ZnO.

7. A laser glass composition as defined in claim 3 in which the glass host comprises about 63 mole percent $TeO_2$, about 4 mole percent CaO, and about 33 mole percent ZnO.

8. The new use for a glass composition as a glass laser article in which the glass comprises $TeO_2$, CaO and ZnO in which the proportions thereof in molar amounts are defined within the areas formed by the heavy lines connecting the points ABCD of the ternary diagram in the FIGURE of the drawings, and which glass composition is a host for an effective lasing amount of $Nd_2O_3$, the new use comprising the steps of:
   1. forming a glass laser article from the glass composition;
   2. pumping the laser article to provide an energy-inversion; and
   3. lasing the pumped laser article.

* * * * *